(12) United States Patent
Giovannini

(10) Patent No.: US 10,302,757 B2
(45) Date of Patent: May 28, 2019

(54) AID SYSTEM AND METHOD FOR VISUALLY IMPAIRED OR BLIND PEOPLE

(71) Applicant: WINA S.R.L., Lomazzo-Como (IT)

(72) Inventor: Romano Giovannini, Cologno Monzese (IT)

(73) Assignee: WINA S.R.L., Lomazzi-Como (IT)

(*) Notice: Subject to any disclaimer, the term of this patent is extended or adjusted under 35 U.S.C. 154(b) by 486 days.

(21) Appl. No.: 14/906,902

(22) PCT Filed: Jul. 22, 2014

(86) PCT No.: PCT/IB2014/001370
§ 371 (c)(1),
(2) Date: Jan. 22, 2016

(87) PCT Pub. No.: WO2015/011548
PCT Pub. Date: Jan. 29, 2015

(65) Prior Publication Data
US 2016/0154100 A1    Jun. 2, 2016

(30) Foreign Application Priority Data

Jul. 24, 2013  (IT) .............................. MI2013A1241

(51) Int. Cl.
*A61H 3/06*       (2006.01)
*G01S 13/87*      (2006.01)
*G01S 13/88*      (2006.01)

(52) U.S. Cl.
CPC ............ *G01S 13/878* (2013.01); *A61H 3/061* (2013.01); *G01S 13/88* (2013.01);
(Continued)

(58) Field of Classification Search
CPC .................. A61H 3/061; A61H 3/068; A61H 2201/5048; A61H 2201/0157;
(Continued)

(56) References Cited

U.S. PATENT DOCUMENTS 5,687,136 A * 11/1997 Borenstein ............. A61H 3/061
                                                     367/116
7,755,744 B1 * 7/2010 Leberer .................... G01C 3/08
                                                      356/5.1
(Continued)

FOREIGN PATENT DOCUMENTS

GB           2460278 A      11/2009
WO    WO2012129368 A1       9/2012

*Primary Examiner* — Olumide Ajibade Akonai
(74) *Attorney, Agent, or Firm* — Cantor Colburn LLP

(57) ABSTRACT

An aid system for the visually impaired or blind includes a first tag positionable on an object and having a first receiver/transmitter that receives an interrogation and transmits a data signal containing an identification code, a user interface device for a user associated to a second tag having a second receiver/transmitter that transmits a data signal containing an identification code of the user interface device and receives a data signal; a local receiver detecting a location of the first and second tags, and a control unit communicating with the local receiver and storing data, wherein the data signals contain: from the tag to the receiver, the identification code; from the receiver to the control unit, the identification code and the location of the first and second tags; and from the control unit to the user interface device, the location and identification code of the first tag.

9 Claims, 7 Drawing Sheets

(52) U.S. Cl.
CPC .. *A61H 2003/063* (2013.01); *A61H 2003/065* (2013.01); *A61H 2201/5058* (2013.01); *A61H 2201/5064* (2013.01); *A61H 2201/5082* (2013.01); *A61H 2201/5087* (2013.01); *G01S 13/874* (2013.01)

(58) Field of Classification Search
CPC .............. A61H 3/066; A61H 2003/063; A61H 2201/5097; A61H 2201/5058; A61H 2201/5064; A61H 2201/5082; A61H 2003/065; A61H 2201/165; A61H 2201/5012; A61H 2201/5061; A61H 2201/5076; A61H 3/04; A61F 9/08; G01C 21/20; G01C 21/165; G01C 21/206; G06K 2017/0045; G06K 9/22; H04M 1/72594; G01S 13/876; G01S 13/93; H01Q 1/1221; H01Q 1/2225; G08B 13/2417; H04W 4/80; H04W 4/008; H04W 4/02; H04W 4/38; H04W 84/18; H04B 5/0062

See application file for complete search history.

(56) References Cited

U.S. PATENT DOCUMENTS

| | | | |
|---|---|---|---|
| 2005/0124376 A1* | 6/2005 | Wu | A61H 3/061 455/550.1 |
| 2006/0286972 A1* | 12/2006 | Kates | H04M 1/05 455/415 |
| 2008/0120029 A1* | 5/2008 | Zelek | G01C 21/20 701/469 |
| 2011/0195701 A1 | 8/2011 | Cook et al. | |
| 2011/0307172 A1* | 12/2011 | Jadhav | G09B 21/001 701/491 |

* cited by examiner

AID SYSTEM AND METHOD FOR VISUALLY IMPAIRED OR BLIND PEOPLE

TECHNICAL FIELD

The present invention relates to the field of aid systems and methods for visually impaired or blind people.

STATE OF THE ART

Aid systems for visually impaired or blind people are known in prior art.

People suffering from visual disabilities (blind and visually impaired people) currently have limits as regards independence and everyday management in the domestic environment and more generally in indoor spaces (workplaces, private and public offices, accommodation facilities, stations, museums, airports, etc.).

Trying to generally briefly define the problems that such people have to face, firstly it is possible to mention that they are not able to find objects (eg. lost objects, objects moved by other people, accidentally fallen objects, objects whose position is not known a priori, etc.).

The same thing is valid when the person desires to know the position of objects or the arrangement of the spaces (above all if the user is there for the first time). Further similar problems are related to the fact of knowing the services and available functions or the paths available in the surrounding space.

Moreover, the blind or visually impaired person has to face serious problems when he/she desires to know functional characteristics, dimensional characteristics, the material or the condition (e.g. idle, in operation, open, closed, direction of rotation etc) of the objects, above all in new or unknown spaces.

Finally the person suffering from visual disability, has difficulties or is completely unable to know possible dangers along the path and the condition of specific plants. In order to help people suffering from visual disability some solutions are available in prior art which, however, as it will be seen below, are not optimal as regards all the aspects of interest just mentioned.

A known solution, for example, is the one disclosed in the Canadian patent CA 2739555, which discloses a portable device, similar to the cane usually used by blind people, which is equipped with a GPS system.

Thus the location of the device is determined on the basis of the geographical space coordinates of the GPS receiver.

However this solution is not enough accurate (the deviation from the real location reaches some meters), it is not generally usable in indoor spaces (except for rare cases) and it does not allow the person to know the characteristics of the objects/plants surrounding him/her.

A different solution, in principle usable in an indoor space, is the one described in the international application WO 2011083963, based on RFID sensors detectable by a cane with a suitable RFID antenna.

A problem related to this solution is that the RFID tag is detected only when the antenna of the cane is at few centimeters of distance: this limits the possibility of using it to the detection of tags placed in close proximity to the person. Moreover the system is limited to define a path and it does not allow for example suddenly interposing obstacles to be detected, along the path defined by RFID tags. Still another known solution is the one described in the international application WO 2012/090114: in this case a portable device is provided, equipped with infrared sensors, similarly to a Sonar.

The device described here indicates the obstacles to the person and in some cases it indicates also the distance between the user and the obstacle along the path.

However the identification of the type of obstacle is absent, which cannot be performed with an infrared sensor; moreover this system provides a certain training of the person, that has to learn how to suitably move the detecting device for "mapping" the obstacles around him/her.

Finally the international application WO 2012/106075 provides a solution using the Wi-Fi communication technology for localizing the position of a user by a mobile device.

In this case, however the space position (on the three axes X, Y, Z) is determined on the basis of accelerometers and of a static and external mapping, that is on the basis of the position, known beforehand, of the space planimetry, of the arrangement of elements and of the location of Wi-fi spots.

Such topography (or mapping) like the one of the normal navigators for automobiles, therefore provides an external update for being conformable to the spaces: therefore the mapping of the spaces has to be updated periodically and it is performed by third parties.

Moreover the Z position (or vertical dimension) is determined only on the basis of the Wi-fi spot device to which the mobile device is connected and whose location is known only by means of the loaded map. That is to say, if a Wi-Fi spot or any other element within the planimetry is moved (for example X, Y coordinates being the same, but at the lower floor, that is a different Z) without updating the static mapping, actually the correctness of information about the space location of the mobile device will be lost. In the example, the mobile device would be "convinced" of being still coupled to a Wi-Fi spot of the upper floor.

Finally another problem of such solution is that it has a poor accuracy: typically the localization occurs with a deviation changing from one to three mt.

Still another known solution is the one described in the international application GB 2009/2460278A: in this case there is provided a mobile device, equipped with position sensors for the orientation in a cinematographic set or a theater.

This situation, provides the possibility of avoiding possible obstacles, but not the possibility of knowing their nature and moreover it deals with a space known beforehand such as for example a theater, wherein the space, geometric components are known, and in most cases, also the number and the nature of the objects/persons present therein are known.

Therefore all information has to be pre-loaded in the computer and when the set is modified, it is necessary to update also information about the space and the objects. Therefore it does not solve the problem in all the spaces, especially in the spaces not known beforehand.

OBJECTS AND SUMMARY OF THE INVENTION

The aim of the present invention is to overcome the prior art drawbacks.

Particularly it is an aim of the present invention to provide an aid system for visually impaired or blind people that can be used in an indoor space, with a high accuracy, that provides information about the objects present in the space, that does not need preliminary detection or mapping events, that does not need continuous updating/mapping operations by third parties, that is relatively simple to be used and relatively inexpensive, while contemporaneously being it possible to install it in indoor empty spaces, in spaces to be furnished, and in existing and already furnished spaces.

These and other aims of the present invention are achieved by a system according to the first independent annexed claim and a method according to the annexed claim 9. The sensors operatively coupled to each tag, according to the invention, are sensors intended to measure or detect physical quantities, for example temperature, condition, light sensors or the like.

This allows the blind or visually impaired user to know the condition of some objects surrounding him/her, for example the user can remotely know whether a radiator is hot or not, with no need to move near it to touch it with the hand.

This arrangement is particularly useful also when it is necessary for the user to have not visually impaired guests: in this case for example he/she will be able to know the lighting condition of the room and will be aware if for the guests it is necessary to switch a lamp or another light source on.

Thus the blind or visually impaired person is able to know accurately the space location of the tagged objects, at the same time knowing the nature of such objects, both for furnishing elements (tables, seats, closets and the like) and functional elements (radiators, windows and the like) and other objects of common use (remote controllers, keys, telephones, pill boxes and the like) and knowing the physical parameters related to such tagged objects.

Therefore the person is aware of the space surrounding him/her and he/she can easily move and interact with it, overcoming or alleviating for some aspects the handicap of his/her condition and obtaining a greater independence.

Then if one thinks of the fact that such system can be provided in hotel rooms (that usually the user does not know as well as his/her house) or similar spaces, it results that the blind or visually impaired person thus has a greater independence.

An interesting aspect of the present invention is related to the fact that the tag identification (both location and nature) occurs in real-time, possibly as requested by the system that interrogates the tags: this allows pre-loaded maps in common with some known solutions to be avoided, which often do not reflect the real location of the objects in the environment.

Obviously if the environment is frequented by many blind or visually impaired persons the system can comprise a plurality of user interfaces.

The search and the update in real-time of the objects in the environment by detecting the tags associated thereto, mainly allows the user to know and learn about the surrounding space and consequently also, but not only, with respect to his/her space position, the path necessary for reaching the location of the selected tag.

It has to be noted generally that such path is not known beforehand except when this is requested, since the locations of the taggable objects may change with respect to the moment of the last request made by the user.

In this case, by the interactive communication, still in real-time, between the system and the user, through the interface, it is also possible to guide, but not only, the user to the "desired", namely the tag corresponding to the object that he/she desires to reach, also indicating him/her possible obstacles along the path.

The latter in turn are also defined by one or more tags.

Since the system does not need a path map detected or defined beforehand it does not use external information related to the topography and morphology of the space, both generated by the user, and prepared and distributed by third parties, to be periodically downloaded.

In substance, the mapping of the spaces and of the objects present, including their orientation, is made by the system in real-time, it is managed together with the control unit, with the consequent advantages deriving therefrom.

Moreover each new tag that becomes a part of the space wherein the system of the invention is provided, is automatically and immediately recognized without the need of being updated; at the same time each tag leaving the space wherein the system is provided, is automatically excluded from the objects that are available and that can be interrogated till it will become a part of it again.

Then if the system is equipped with connections to internet, VPN, private networks and the like, it is also possible to put in communication two or more local control units that receive information about the location of local tags, by means of local position sensors, such that the user can search (and know information about) the tags present also in remote areas. For example, if the user is in a hotel room where the invention is provided, it is possible for him/her to communicate with the control unit of his/her house in order to know whether he/she has left the pill box at home.

As an alternative, the user has to bring with him/her a mobile control unit that allows him/her to be in communication with the home control unit or with any other control units he/she has the access authorization for.

Finally, in addition to the space location, the distance and the path, the user can also know by a simple request (ON-DEMAND) the main characteristics (as regards the dimension, material, function etc.) and/or the condition of the tagged objects (eg. open/closed/direction of rotation, on, off etc) such that, if necessary or if requested, direct actions can be carried out, automatically (eg. opening/closure when passing along the path) by suitable actuators operatively connected to the tag or in communication with the system or manually, with a confirmation by the user.

Information about dangers (eg. obstacles along the path or important events as fires or floods) or important changes in the locations and/or in the characteristics of tagged objects defined by the user as "to be monitored", are automatically indicated to the user by the system, that is with the user not making a request for it (OFF-DEMAND), such that the user can interact with the control unit and can timely steer clear of them in the path. Both in the case of space changes and in the case of changes of anomalous physical quantities, the user is automatically warned by means of the mentioned communication methods.

The invention further relates to an aid method for blind or visually impaired people according to claim 9 and the following ones.

Further advantageous characteristics are the subject of annexed claims, which are an integral part of the present disclosure.

In substance according to the invention, the tags not only define the space locations of the objects, but they allow also other data to be known, such as the nature of the element associated with the tag, its geometrical shape, its material and so on and consequently it allows to know what type of object is desired to be reached or to steer clear of (obstacle).

Moreover the system allows, in real-time, the instantaneous values of the space to be changed, on the basis of the movement of all the tags in the surrounding space and it allows them to be communicated to the user requesting them.

Thus it is possible to remotely know whether along the path there are obstacles, even before moving, and also it is possible to know what type of obstacle it is, and possibly its shape, dimension, material and all the other available information.

According to a particularly advantageous characteristic, the system is most appreciated and functional in the case wherein it is not possible to know beforehand the space and the shape of the surrounding environment, since it is calculated dynamically and in real-time, upon the request made by the user.

Thus there are no pre-loaded maps or maps to be updated as in normal navigators, in the device (control unit) and in the computer, but on the contrary the three-dimensional and multi-dimensional maps, considering the physical quantities, composed not only of information about the spaces but also of information about the objects present therein, derive from complicated computations made in real-time, at each request and automatically updated in the case of a navigation request.

This allows excessive memory spaces on the device, on the computer not to be occupied, and above all the spaces are an integral part of the service and do not need any update by third parties for pre-loaded maps, maps to be downloaded or to be periodically updated.

That is to say, by the invention, the user "discovers" and "becomes aware" of the space and of what is available only when he/she makes a request; possible changes in such space (even in terms of observable/controllable functions and/or plants) are thus communicated to the user when he/she requires them and are apart from the need of navigating in the space itself (the user for example may only desire to know the condition of a window—open or closed—or where he/she has left the pill box, without wanting to go in the proximity thereof).

BRIEF DESCRIPTION OF THE DRAWINGS

The invention will be described below with reference to non-limiting examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

Figure 1:
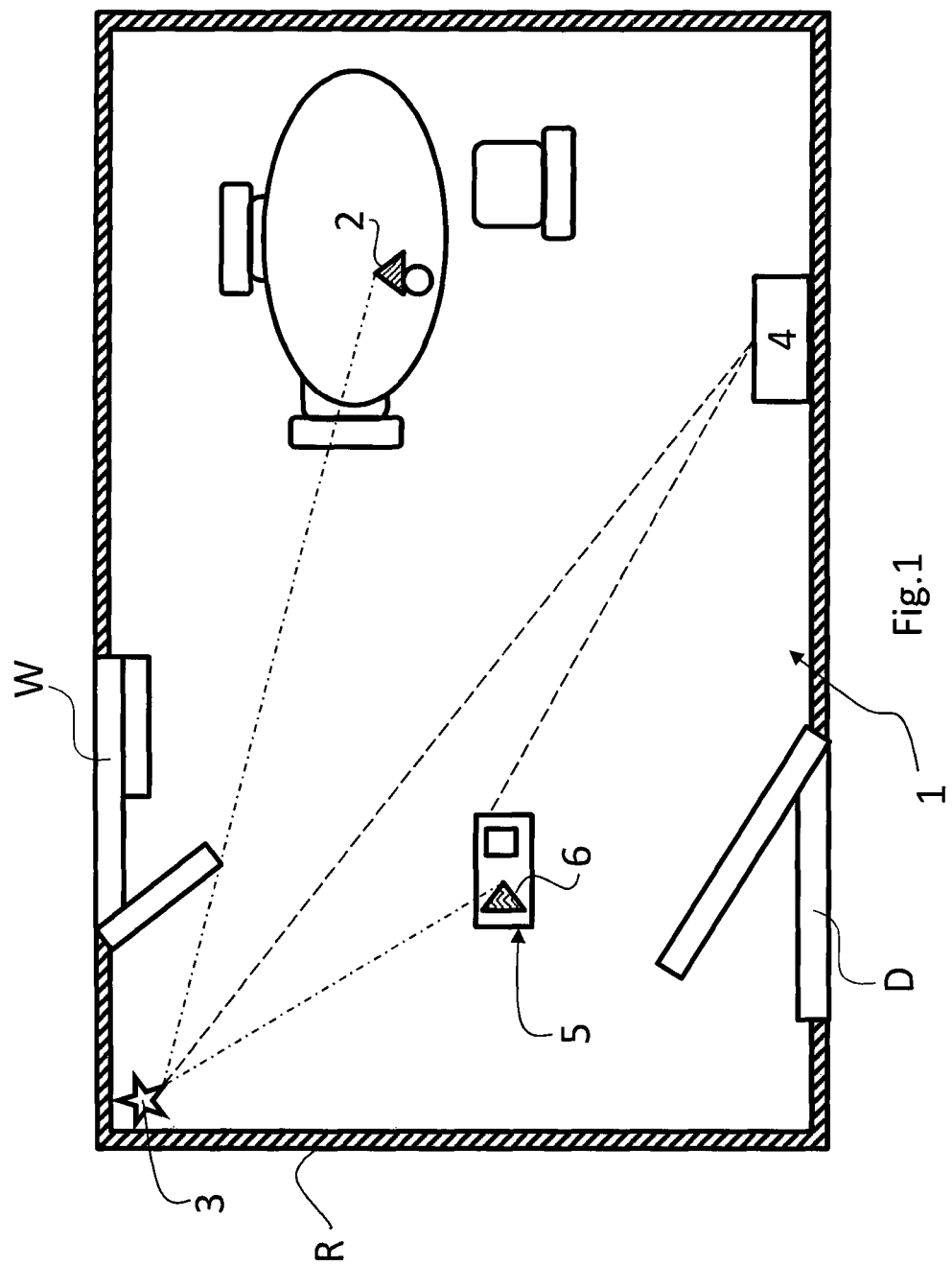
FIG. 1 is a plan view of an indoor space wherein a basic simplified arrangement of the system of the invention is installed.

While the invention is susceptible of various modifications and alternative forms, some disclosed relevant embodiments are shown in the drawings and will be described below in detail.

It should be understood, however, that there is no intention to limit the invention to the specific embodiment disclosed, but, on the contrary, the intention of the invention is to cover all modifications, alternative constructions, ergonomic forms and equivalents falling within the scope of the invention as defined in the claims.

The use of "for example", "etc", "or" indicates non-exclusive alternatives without limitation unless otherwise defined.

The use of "including" means "including, but not limited to," unless otherwise defined.

The aid system 1 for visually impaired or blind people according to the invention, in a basic arrangement thereof, shown in FIG. 1 comprises a first tag 2 positionable on an object, in this case a lamp.

Figure 3:
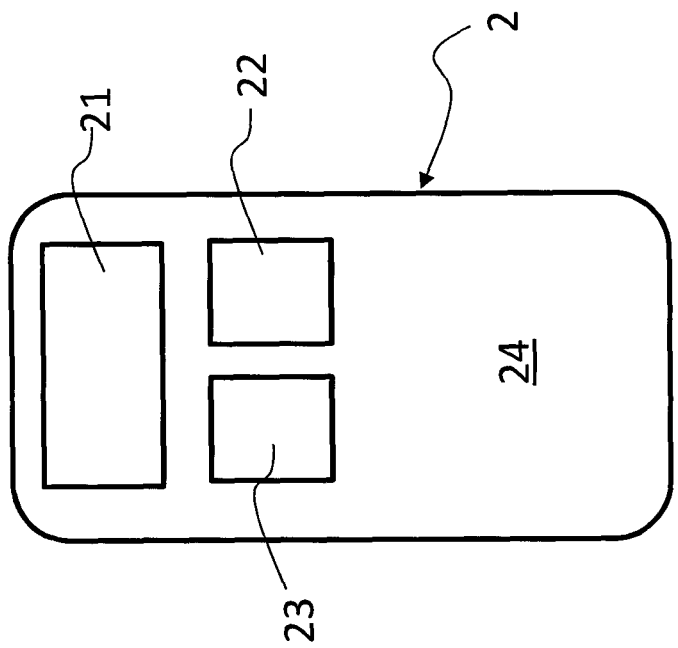
FIG. 3 schematically is a tag of the system of the invention in a simple or basic arrangement.

The tag 2, in such basic arrangement can be seen in FIG. 3 and it is provided with a first receiver/transmitter 21, intended to receive at least one enquiry and to transmit at least one data signal containing at least one identification code of said first tag. To this end together with the receiver/transmitter 21, the tag 2 comprises a storage unit and an integrated circuit 22 in communication with the receiver/transmitter 21 and an electric battery 23.

The tag 2 further comprises a body 24 on which its operative components (receiver/transmitter 21, storage unit and integrated circuit 22 and electric battery 23 in the case of the simplest tag 2) are assembled.

The tag 2, or more precisely its body 24, can be fastenable to an object or is positionable in its close proximity in a different manner depending on needs: for example it can be provided with a hook-and-loop fastener, a two-side adhesive, threaded connections (screws, bolts or holes for the latter) or the like: it has to be intended that the manner for fastening the tag on the objects or in their proximity is not an object of the invention and generally it falls within the range of a person with average skill in the art; for this reason no further reference is given on such detail. With reference again to FIG. 1, the system 1 further comprises a user interface device 5, shown in FIG. 4.

The user interface device 5 is intended to be held by a visually impaired or blind user (or brought with him/her) and it is the interface for the interaction of the user with the system 1.

Figure 4:
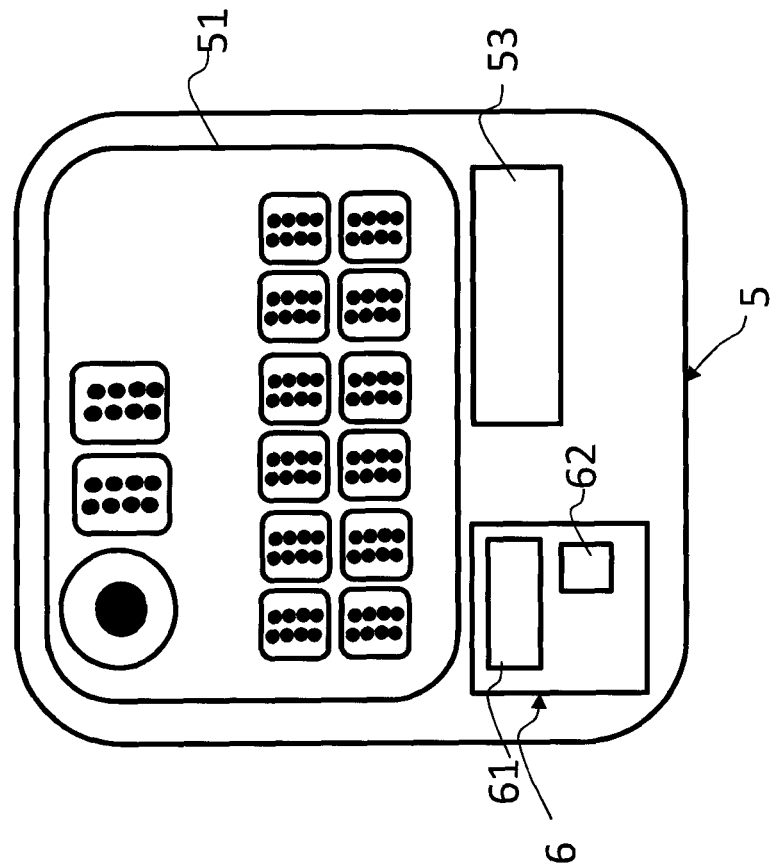
FIG. 4 schematically is a user interface device of the system of the invention.

To this end the user interface device 5 is provided with interface means 51 for users suffering from visual disabilities, such as for example vibration, a loudspeaker audio output for transmitting audio signals and/or a braille character display, of a type known in se (FIG. 4 shows both of them but only the display or only the loudspeaker may be provided). Moreover the user interface device 5 optionally is provided (in combination or as an alternative) with an accelerometer sensor and with a gyroscope in order to use also pre-set commands of the sign type.

Then the interface means comprise also a braille keyboard and/or a microphone for exerting speech commands (again in FIG. 4 both of them are shown, but only the braille keyboard or only the microphone may be provided).

The keyboard, in addition to braille characters, may also provide information in normal characters.

Such user interface device 5 is associated to a second tag 6, which likewise the first tag 2, is provided at least with a receiver/transmitter 61 intended to transmit a data signal containing at least one identification code of the user interface device 5 and to receive a data signal.

The second tag 6 can be provided with its own internal storage unit 62 and with its own power supply, for example a dedicated electric battery, or preferably such as shown in FIG. 4 it can use the power battery 53 of the device 5.

With reference again to FIG. 1, the system 1 further comprises a local receiver 3 intended to receive at least the data signal transmitted from the first tag 2 and from the second tag 6 and to detect at least one three-dimensional space location of said first 2 and second 6 tags.

In this case, the basic arrangement of the system 1 uses receivers with RF flat antennas (within the 868 MHz band) each one allowing the reception from a kind of "half-bubble", that identifies the tag. The transmitting power and the sensitivity of the receivers are regulated such to detect the presence of the tag only within a half-bubble (that is to "adjust" the size of the half-bubble).

In this case the tags communicate by RF (868 MHz) and by Wi-Fi with the control unit.

This solution, even if quite inexpensive, has an accuracy level in XYZ axes of some meters and it is a solution more suitable for visually impaired persons.

Now it has to be noted that in this example the local receiver 3 carries out both the functions of receiving the signals transmitted from the tags 2 and 6 and of detecting their space location; on the contrary in other embodiments not shown there are provided local receivers that carry out only one function or the other one.

The local receivers 3 comprise also signal or data transmitting means.

Then the system comprises a control unit 4 intended to be put in communication with the local receivers 3.

To this end the control unit 4 is provided at least with receiving/transmitting means and with storage means for storing the data.

During the operation of the system 1 the control unit transmits and receives the signals from and to the local receivers 3 and the tags 2 and 6.

More in detail at least a part of the data signal transmitted from the control unit 4 to the user interface device 5 contains data about the space location of said first tag 2 and data about the identification of the first tag 2.

Each tag 2 can contain in the storage and can transmit, when interrogated, data about the object on which it is applied.

To this end the method and the system of the invention provide an "initiation" step of the tag, wherein to a tag equipped with its own identification code there is associated a (data) descriptor of the object on which it is applied.

Such initiation step can be carried out in two different manners, depending on needs: in a first manner a descriptor datum of the object on which the tag is applied is stored in the storage of the tag, in a second manner a database (also a simple table) is stored for example in the control unit 4 wherein a descriptor of the object on which it is applied in the space is associated to each identification code of the tag.

In such second case once the identification code of the tag is sent to the control unit, it provides to associate it to the descriptor and to send to the user interface device not only the location but also the descriptor, possibly omitting the code of the tag; it has to be noted that, in a broad sense, also the descriptor of the object is a datum about the identification code of said tag, since it can be derived univocally therefrom.

The interrogation of the tag 2 occurs upon the reception of a signal, transmitted from the control unit 4.

Figure 2:
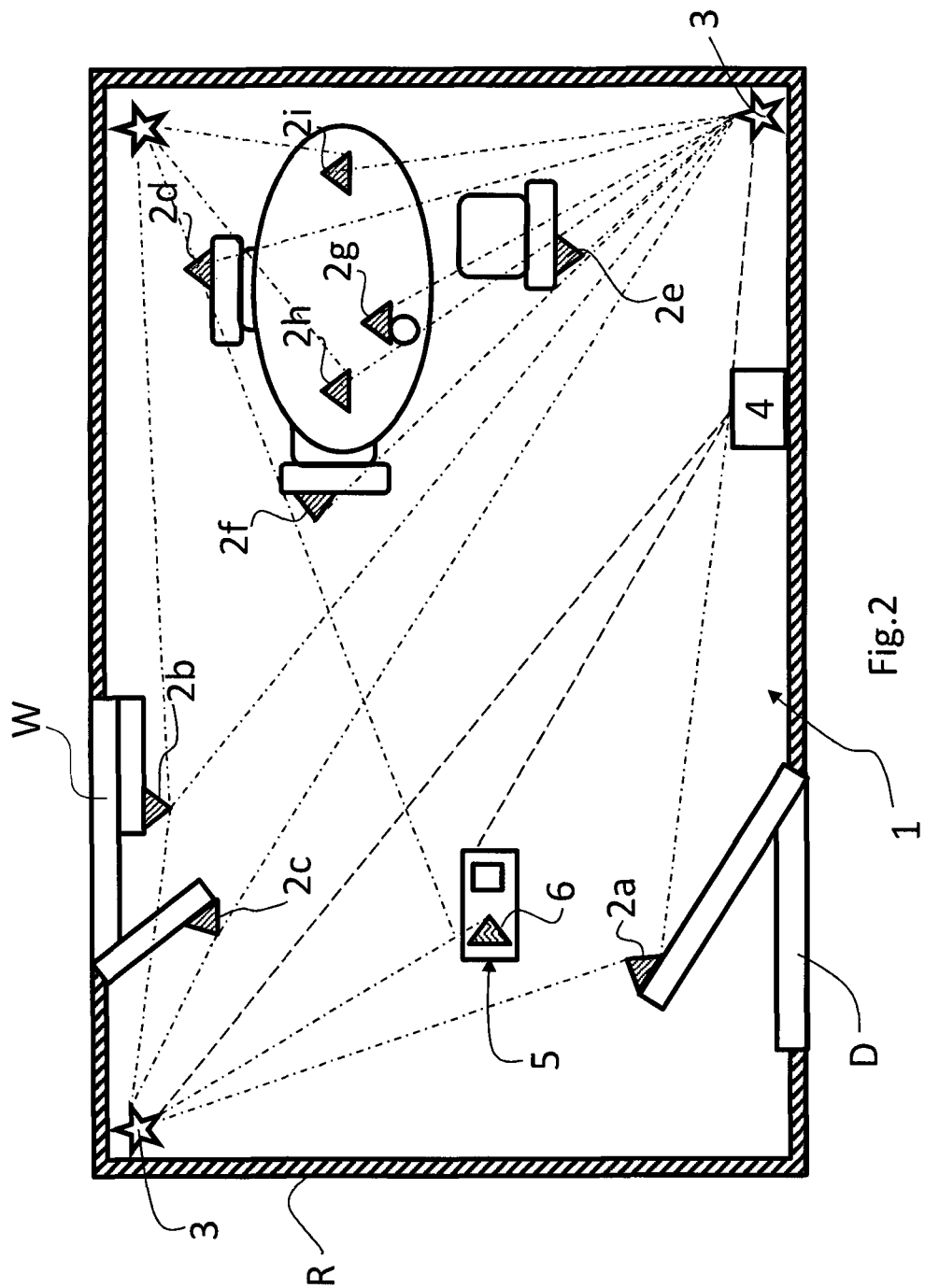
FIG. 2 is a plan view of an indoor space wherein an evolved arrangement of the system of the invention is installed.

The tags 2, such as shown in FIG. 2, can be applied on:
movable objects of everyday use (e.g. pill boxes, keys, etc.);
bearing structures or infrastructures (e.g. walls, floors, ceilings, etc.);
semi-movable objects (e.g. doors, windows, rolling shutters, emergency exits, etc.);
in entire spaces (e.g. bathroom, kitchen, offices, bedroom, etc.);
in indoor spaces
on persons or animals.

All such objects/persons/spaces/things will be defined below generally as "taggable objects" for shortness purposes.

More in general, a taggable object means anything the user believes to be more or less important for his/her life/everyday life/independence/health/personal needs. To each taggable object a combination of one or more tags 2 is univocally associated thus by identifying the location of each tag in the space, it is possible to define the location and possibly the orientation in the three space dimensions (XYZ) of the individual taggable objects with an accuracy of few cm.

In the communication between the tag 2, 6, the local receivers 3 and the control unit 4, the identification code of the tag 2, 6 is transmitted to the control unit 4 which not only is able to define the space position of the tag 2 or of the interface device 5 by means of the tag 6, but also the object to which it is associated, by comparing the identification code with a series of codes stored in a database in its storage.

Generally the system 1 is definitely versatile, it is possible, from time to time, to define and/or add in the database stored in the unit 4 new families of taggable objects and types of taggable objects, to be associated to the tags, such to adapt the system 1 to the several installation needs.

Advantageously the tag 2 is able to store and transmit also other data in addition to its own identification code: for example it can store a dimensional or size attribute, which is composed of the dimension of the object and/or of the weight and/or the main material it is made of.

As an alternative such information are stored in the database of the unit 4 and are available to the user or used when necessary.

The local receivers 3 interact with the tags 2 to determine their space location in the three dimensions.

To this end several technologies are available, to be used in an indoor space (therefore GPS technology is excluded since it does not operate in an indoor space or however it has position errors that are too wide for being useful for the present purposes).

In the example of FIG. 2 the tags 2 are denoted as 2a, 2b . . . 2i such to distinguish them one from the other depending on the objects on which they are applied. In this case the system comprises at least three receivers that operate with the triangulation method with UWB technology (Ultra Wide Band). The signal then is sent to the control unit by LAN (Local Area Network) with a proprietary protocol for the processing.

For example the tags 2a, 2b, 2c are placed on the panels of the door D and of the window W respectively, while tags 2d, 2e, 2f are placed on the seats, the tag 2g is placed on a lamp and the tags 2h, 2i are placed on the table.

Figure 5:
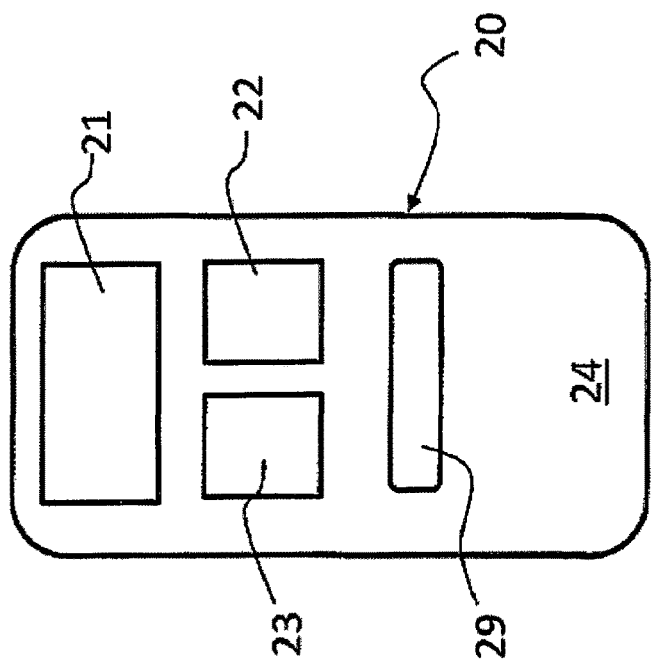
FIG. 5 schematically is a tag of the system of the invention in an evolved arrangement.

As regards the latter, it has to be noted that if it is necessary to know the space orientation of the taggable object (in this example a table) it is necessary in some embodiments to place two tags thereon: the system 1 by detecting the space location of the first and second tag 2h, 2i associated to the table is thus able to determine the space arrangement (orientation) and to transmit it, if necessary, to the user device 5. In an evolved arrangement, shown in FIG. 5, the tags (here denoted by the reference 20 regarding the evolved arrangement) are then equipped with sensors 29 for measuring physical quantities, particularly environmental physical quantities.

The sensor 29 is at least one among:
Light sensors (or optical sensors)
Sound sensors
Acceleration sensors
Temperature sensors
Humidity sensors
Heat sensors
Radiation sensors
Subatomic particle sensors
Electric resistance sensors
Electric current sensors
Electric voltage sensors
Electric power sensors
Magnetism sensors
Pressure sensors
Gas and liquid flow sensors, including anemometers, flowmeters, rain gauges, air speed indicators;
Displacement sensors
Orientation sensors
Force sensors
Proximity sensors
Distance sensors
Biometric sensors
Chemical sensors Thus the user can remotely know the characteristics of the taggable object (e.g. temperature, lighting, etc) that, for example indicate the operating condition (think of a radiator or a lamp).

In more evolved arrangements of the system 1, it comprises also at least one actuator operatively associated to a tag 2, 20 for controlling its operation.

The actuator for example can be at least one among: an electric switch (relay), an hydraulic valve, a pneumatic valve, an electric actuator, a pneumatic actuator, a piezoelectric actuator, an electric motor, an electroactive polymer, MEMS.

Thus the user can remotely control the operation of the actuator in order to determine the behavior of objects (eg. a lamp switched on/off).

Finally in addition to the space location, the distance and the path, the user can also know by a simple request, the main characteristics (dimension, material, functions, etc.) and/or the condition of the taggable objects (eg. open/closed/direction of rotation etc.) such that, if necessary or required, direct actions can be carried out, automatically (eg. closing/opening upon the passage along the path, etc) or in a manual manner, with a confirmation by the user.

The system 1 is also able to determine a path or trajectory by considering the position of the tags 2, 20 that may be obstacles on the path of the blind person.

Generally the path is not known a priori except when this is requested, since the positions of the taggable objects can be changed with respect to the moment of the last request made by the user.

In this case by the interactive communication, always in real-time, between the system 1 and the user, it is possible to guide him/her to the "desired", that is the tag 2, 20 that he/she desires to reach, also indicating possible dangers along the path. The latter are also defined by one or more tags 2, 20.

It has to be noted that the system 1 does not need any map of the path detected or determined a priori and it does not use external information related to the topography and morphology of the indoor space, both generated by the user and prepared and distributed by third parties, to be downloaded periodically. In substance the mapping of the spaces and of the objects present therein, including their orientation, is carried out in real-time by the system 1 on the basis of the space arrangement of the tags 2, 20.

FIGS. 6-9 show the flow charts of the method of the invention and the request dynamics by the users or about information automatically sent to the users, by the system 1.

Generally the method of the invention comprises the steps of
a. identifying a three-dimensional space location of a tag in an indoor space
b. identifying a space location of a user interface device and detecting environmental parameters at such tag
c. transmitting said three-dimensional space location of said tag and said environmental parameters to said user interface device
d. generating by said user interface device a signal identifying the space location of said tag and of said environmental parameters, said signal being of the type detectable by users suffering from visual disabilities.

Further additional and advantageous method steps, which can be implemented all together or individually or in groups with the steps mentioned above are about:
e. generating a signalling when the location of the user interface device is near a selected tag;
f. generating a path for moving the user interface device towards one or more tags and/or far from one or more selected tags;
g. identifying and/or locating, in the space, environmental variables by means of sensors placed on said tags;
h. identifying and/or locating, in the space, environmental conditions (temperature, lighting and the like) by means of sensors placed on said tags;
i. actuating or controlling environmental devices (actuators, doors, windows, switches, taps and the like) by means of actuators in communication with said tags.

Figure 6:
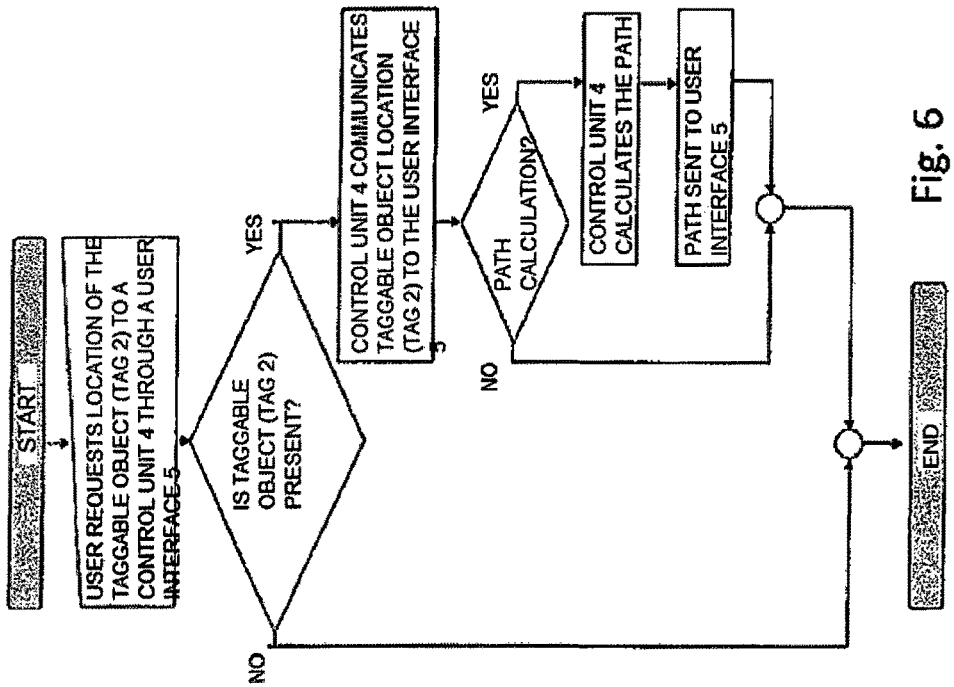
FIGS. 6-9 are flow charts of the method of the invention.

Now with reference to the flow chart of FIG. 6 it describes the method steps carried out upon the request (on demand) by the user of a specific tag 2 and possibly of the path to be traveled for reaching it:
6.1—the control unit 4 receives through the user interface 5 a request for locating in the space a specific tag
6.2—the control unit 4 checks the presence/absence of the tag 2
6.3—if the tag 2 is present the control unit 4 communicates its location to the user interface 5
6.4—if an option of path calculation is selected the control unit 4 calculates the path for taking the user interface device 5 up to the selected tag 2
6.5—once the path is calculated the control unit 4 transmits it to the user interface 5
Optionally (not shown):
6.6—the control unit 4 checks instant by instant the location of the user interface and it repeats the steps 6.4 and 6.5 in order to adjust the paths to the progressive movement of the user interface.

Figure 7:
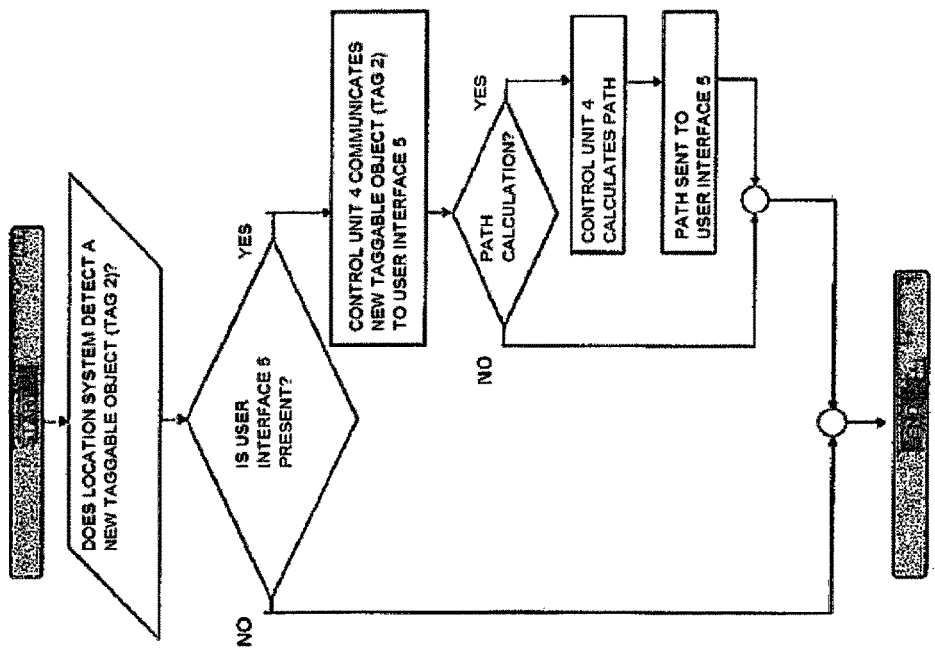

Now with reference to the flow chart of FIG. 7 it describes the method steps carried out when the system 1 detects a new tag 2:

7.1—the control unit 4 carries out a scanning by means of the detectors 3 and it receives a signal corresponding to a new tag 2

7.2—the control unit 4 checks the presence/absence of the user interface 5

7.3—if the user interface 5 is present the control unit 4 communicates the location of the new tag 2 to the user interface 5

7.4—if an option of path calculation is selected the control unit 4 calculates the path for taking the user interface device 5 up to the selected tag 2

7.5—once the path is calculated the control unit 4 transmits it to the user interface 5

Optionally (not shown):

7.6—the control unit 4 checks instant by instant the location of the user interface and it repeats the steps 7.4 and 7.5 in order to adjust the paths to the progressive movement of the user interface.

Figure 8:
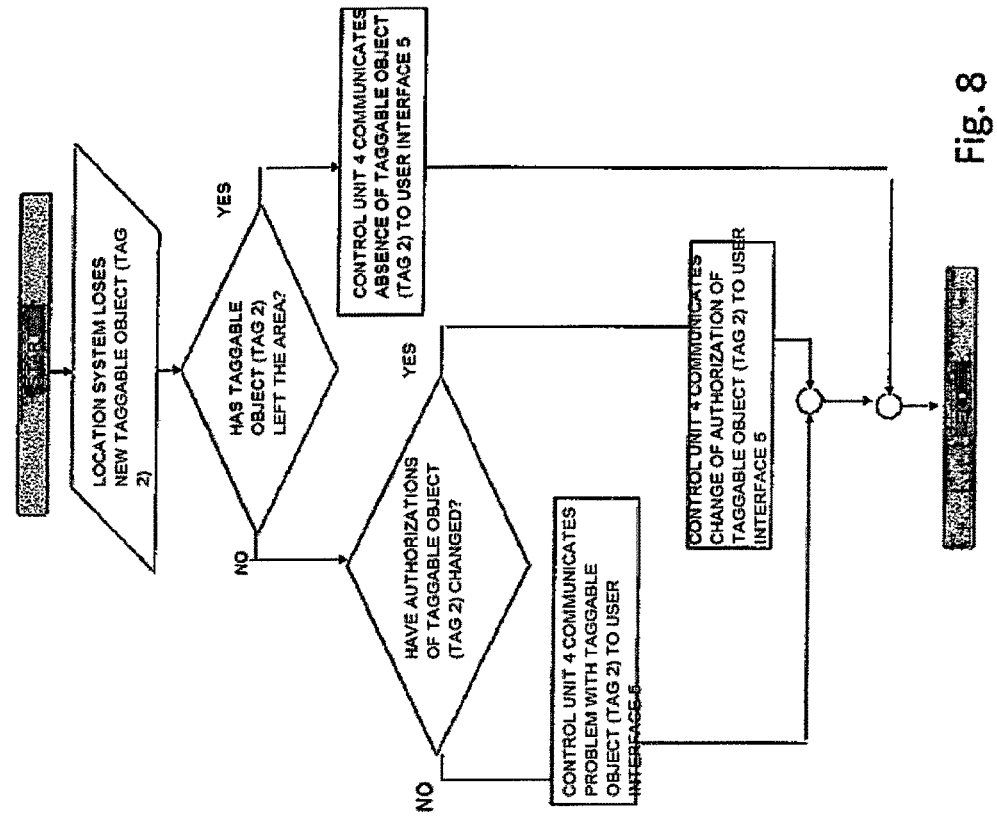

Now with reference to the flow chart of FIG. 8 it describes the method steps carried out when the system 1 loses (namely it does not detect) a previously detected tag 2:

8.1—the control unit 4 carries out a scanning by means of the detectors 3 and it does not receive a signal corresponding to a previously detected tag 2;

8.2—the control unit 4 checks whether the tag 2 is gone outside the detection area or whether the detection authorizations have changed;

8.3—if the detection authorizations of the tag 2 have changed, the control unit 4 communicates it to the user interface device 5;

8.4—if the detection authorizations of the tag 2 have not changed, the control unit 4 communicates to the user interface device 5 a possible problem with the tag 2

8.5—if the tag 2 has left the detection area the control unit 4 communicates to the user interface device 5 the absence of the tag 2.

Figure 9:
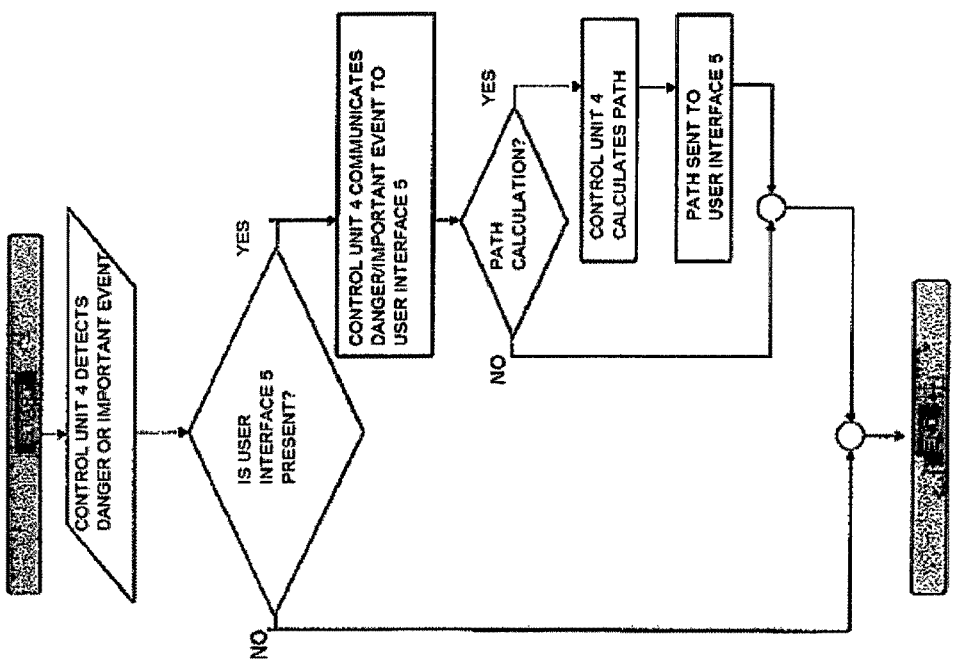

Now with reference to the flow chart of FIG. 9 it describes the method steps carried out when the system 1 detects a danger or an important event:

9.1—the control unit 4 detects a danger or an important event;

9.2—the control unit 4 checks the presence/absence of the user interface 5;

9.3—if the user interface 5 is present the control unit 4 communicates the danger or the important event to the user interface 5;

9.4—if an option of path calculation is selected the control unit 4 calculates the path for taking the user interface device 5 up to a tag 2 pre-set on the basis of the type of danger (e.g. an emergency exit);

9.5—once the path is calculated the control unit 4 transmits it to the user interface 5

Optionally (not shown):

9.6—the control unit 4 checks instant by instant the location of the user interface and it repeats the steps 9.4 and 9.5 in order to adjust the paths to the progressive movement of the user interface.

Figure 10:
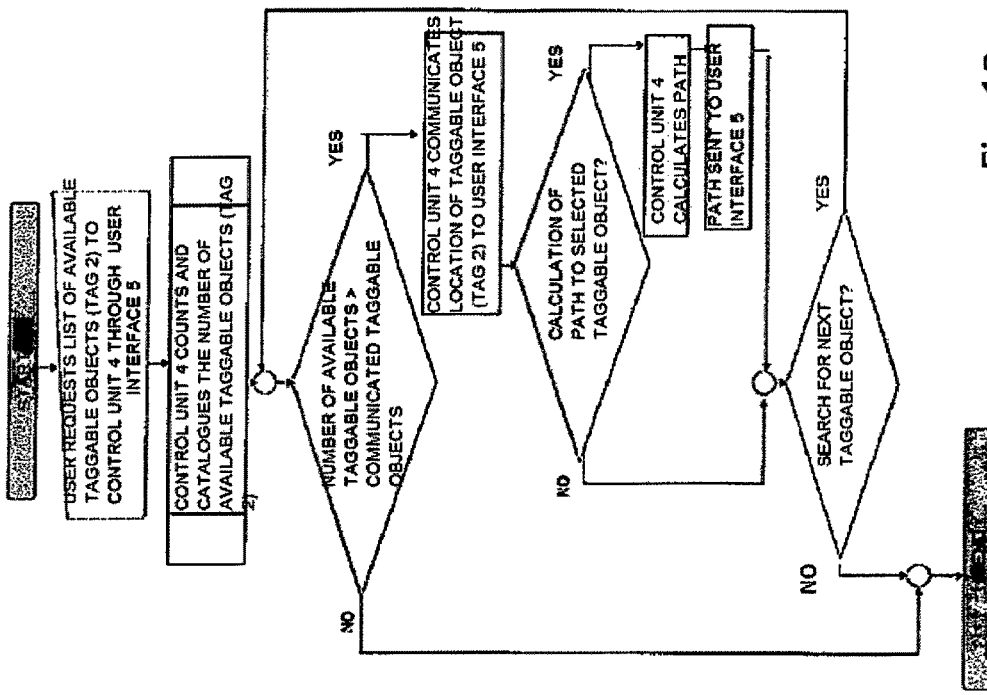
FIG. 10 is a flow chart illustrating the method when the user wants to know the taggable objects or the tags in a room or space.

Now with reference to the chart flow of FIG. 10 it describes the method steps carried out when the user desires to know the taggable objects or the tags in a room or space (indoor):

10.1—the user interface 5 sends to the control unit 4 a request for a tag list 2;

10.2—the control unit 4 counts and catalogues the number of tags 2;

10.3—if the number of tags 2 overcomes the number of the communicated tags, the control unit 4 communicates the location of a selected taggable object to the user interface 5

10.4—if an option of path calculation is selected the control unit 4 calculates the path for taking the user interface device 5 up to a selected tag 2;

10.5—once the path is calculated the control unit 4 transmits it to the user interface 5

Optionally (not shown):

10.6—the control unit 4 checks instant by instant the location of the user interface and it repeats the steps 10.4 and 10.5 in order to adjust the paths to the progressive movement of the user interface.

Figure 11:
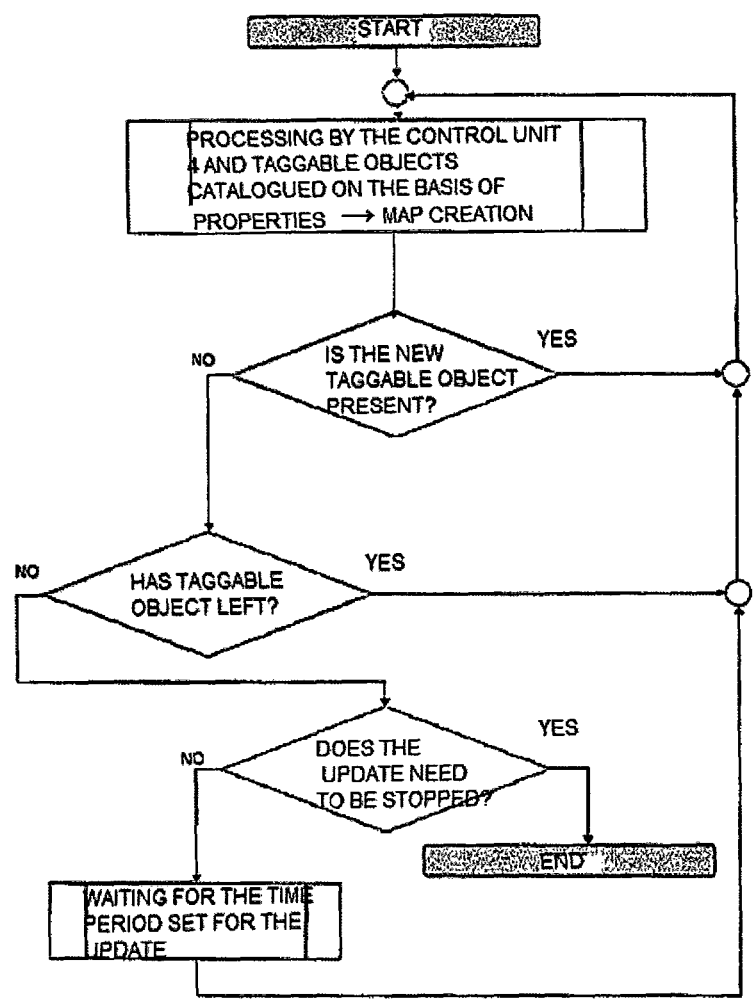
FIG. 11 is a flow chart illustrating the method for creating the maps of taggable objects.

Now with reference to the flow chart of FIG. 11 it describes the method steps carried out for creating the maps of taggable objects equivalent to the tags 2.

11.1—the control unit 4 detects the locations and the properties (e.g. those read by the sensors) of the tags 2;

11.2—the control unit 4 detects the access and exit from the system of tags 2;

11.3—the control unit 4 repeats the previous steps after a certain settable time period. Generally the system 1 can also be integrated with the main automation systems on the market, through the most common interface protocols, MODBUS, CAN-Bus, LonWorks, KNX, OpenWebNet, DOMOTA, FBBet, RS485, RS232, RS422, X10, Ethernet, HTTP, XComm and/or wireless protocols such to complete the independence needs required by the user.

In its broad aspects the advantages of the system of the invention therefore are about the fact of allowing blind people or people suffering from a strong visual disability (visually impaired people) to be more independent in the surrounding space by identifying univocally: movable objects of everyday use (e.g. pill boxes, keys, etc.); bearing structures or infrastructures (e.g. walls, floors, ceilings, etc.); semi-movable objects (e.g. doors, windows, rolling shutters, emergency exits, etc.); entire spaces (e.g. bathroom, kitchen, offices, bedroom, etc.);

In addition in indoor spaces and regardless of the size of each type listed above it allows to univocally identify: persons, animals, the space location of the objects; the knowledge of the properties of the objects mentioned above; the condition of the objects mentioned above.

Moreover in the evolved arrangements the system allows the functions of the objects mentioned above to be also controlled.

The user device 5 is of the portable type, preferably it has the size of a normal mobile phone or the like and it is not connected by cables.

The system 1 is able to calculate a path that takes the user device (and therefore the user holding it or bringing it with him/her) near a selected tag.

According to a variant each tag can be classified within a type among public, private or hidden.

In the first case, it can be detected by everyone, while in the second case it is detectable only by a group of predetermined users, such to guarantee the privacy of the individual users and the fact of being entitled to the search, interrogation and control of the individual tags.

The group of users can be composed also of a single unit.

In order to better understand let us consider two users "a" and "b" as the guests of the same hotel facility.

The user "a" has the possibility of knowing the objects, functions and common spaces offered by the facility, but only the objects, functions of the assigned room, in addition to the personal taggable objects that he/she brings with him/her. The user "b" has also the possibility of knowing the objects, functions and common spaces offered by the facility but only the objects, functions of the assigned room, in addition to the personal taggable objects that he/she brings with him/her. Therefore both the users will not have reciprocal visibility/access to the tags belonging to rooms different than the one associated to them, to personal objects that each person brings with him/her.

In the case of a hidden tag, the latter is used by the system administrator such to monitor or check the regular operation of the system, but it is not detectable by any user interface 5.

The settings about the property of public/private/hidden visibility can be modified by the authorized users or through the administrators of the system 1.

The invention claimed is:

1. An aid system for visually impaired or blind people comprising:
   a first tag (2, 20) positionable on an object and provided with at least one first receive/transmitter (21) and one sensor (29) for measuring physical quantities, said first tag being configured to receive at least one interrogation and to transmit at least one data signal containing at least one identification code of said first tag and data detected by said sensor;
   a user interface device (5) which is:
      provided with at least an interface (51) for users suffering from visual disabilities, and
      operatively coupled to a second tag (6) provided with at least one second receiver/transmitter (61) configured to transmit a data signal containing at least one identification code of the user interface device and to receive a data signal;
   a third local receiver/transmitter (3) configured to detect at least one three-dimensional space location of said first tag (2,20) and said second tag (6);
   a control unit (4) provided with a receiving/transmitting system configured to put said control unit in communication with said third local receiver (3) and with a storage device for storing the data,
   wherein at least a part of the data signal transmitted:
   from the first and/or second tag (2, 20, 6) to the third local receiver/transmitter (3) contains at least said identification code and the data detected by said physical quality sensor,
   from the third local receiver/transmitter (3) to said control unit (4) contains at least said identification code, said data detected by said physical quantity sensor, and data about the three-dimensional space location of said first and/or second tag (2, 20, 6), and
   from the control unit (4) to the user interface device (5) contains the data about the three-dimensional space location of said first tag (2, 20), the data detected by said physical quantity sensor and data about the identification code of said first tag (2, 20).

2. The aid system according to claim 1, wherein said sensor (29) is adapted to measure environmental physical quantities.

3. The aid system according to claim 1, wherein said sensor (29) is selected from the group consisting of:
   light sensors (or optical sensors),
   sound sensors,
   acceleration sensors,
   temperature sensors,
   humidity sensors,
   heat sensors,
   radiation sensors,
   subatomic particle sensors,
   electric resistance sensors,
   electric current sensors,
   electric voltage sensors,
   electric power sensors,
   magnetism sensors,
   pressure sensors,
   gas and liquid flow sensors, including anemometers, flowmeters, rain gauges
   air speed indicators,
   displacement sensors,
   orientation sensors,
   force sensors,
   proximity sensors,
   distance sensors,
   biometric sensors, and
   chemical sensors.

4. The aid system according to claim 1, further comprising an actuator, wherein said first tag (2) is operatively associated to said actuator for controlling an operation thereof.

5. The aid system according to claim 4, wherein said actuator is selected from the group consisting of: an electric switch or relay, a hydraulic valve, a pneumatic valve, an electric actuator, a pneumatic actuator, a piezoelectric actuator, an electric motor, an electroactive polymer, and a microelectromechanical system (MEMS).

6. The aid system according to claim 1, wherein said first tag (2) comprises a storage unit for storing data.

7. The aid system according to claim 1, wherein said control unit (4) is provided with a communication system that receives and transmits signals on a local or remote communication network.

8. The aid system according to claim 1, wherein said interface for users suffering from visual disabilities comprises at least one among: a vibration device, an audio output for reproducing audio and/or speech signals, or a braille character displaying device.

9. An aid method for visually impaired or blind people comprising the steps of:
   a. identifying a three-dimensional space location of a tag in an indoor space and detecting environmental parameters at said tag;
   b. identifying a space location of a user interface device;
   c. transmitting said three dimensional space locations of said tag and said environmental parameters to said user interface device; and
   d. generating, by said user interface devicem a signal identifying the space location of said tag and the detected environmental parameters, said signal being detectable by users suffering from visual disabilities,
   wherein the method is performed with an aid system for visually impaired of blind people comprising:
   a first tag (2, 20) positionable on an object and provided with at least one first receiver/transmitter (21) and one sensor (29) for measuring physical quantities, said first tag being configured to receive at least one interrogation and to transmit at least one data signal containing at least one identification code of said first tag and data detected by said sensor:
   a user interface device (5) which is:
      provided with at least an interface (51) for users suffering from visual disabilities, and operatively coupled to a second tag (6) provided with at least one second receiver/transmitter (61) configured to transmit a data signal containing at least one identification code of the user interface device and to receive a data signal;

a third local receiver/transmitter (3) configured to detect at least one three-dimensional space location of said first tag (2,20) and said second tag (6);

a control unit (4) provided with a receiving/transmitting system configured to put said control unit in communication with said third local receiver (3) and with a storage device for storing the data, wherein at least a part of the data signal transmitted:

from the first and/or second tag (2, 20, 6) to the third local receiver/transmitter (3) contains at least said identification code and the data detected by said physical quantity sensor, from the third local receiver/transmitter (3) to said control unit (4) contains at least said identification code, said data detected by said physical quantity sensor, and data about the three-dimensional space location of said first and/or second tag (2, 20, 6), and from the control unit (4) to the user interface device (5) contains the data about the three-dimensional space location of said first tag (2, 20), the data detected by said physical quantity sensor and data about the identification code of said first tag (2, 20).

* * * * *

UNITED STATES PATENT AND TRADEMARK OFFICE
CERTIFICATE OF CORRECTION

PATENT NO. : 10,302,757 B2
APPLICATION NO. : 14/906902
DATED : May 28, 2019
INVENTOR(S) : Romano Giovannini It is certified that error appears in the above-identified patent and that said Letters Patent is hereby corrected as shown below:

On the Title Page

Item (71) Applicant:
Please replace [[WINA S.R.L.]] with --Romano Giovannini, Cologno Monzese (IT)--

Item (73) Assignee:
Please remove [[WINA S.R.L.]]

Signed and Sealed this
Third Day of December, 2019

Andrei Iancu
*Director of the United States Patent and Trademark Office*